| United States Patent [19] | [11] Patent Number: 4,547,633 |
| Széchényi | [45] Date of Patent: Oct. 15, 1985 |

[54] METHOD OF AND CIRCUIT FOR LOCATING FAULTS IN A DIGITAL TELECOMMUNICATION SUBSCRIBER TERMINATION

[75] Inventor: Kálmán Széchényi, Spielberg, Fed. Rep. of Germany

[73] Assignee: International Standard Electric Corporation, New York, N.Y.

[21] Appl. No.: 555,903

[22] Filed: Nov. 29, 1983

[51] Int. Cl.⁴ .............................................. H04B 3/46
[52] U.S. Cl. .................... 179/175.3 F; 179/175.31 E; 371/22
[58] Field of Search .................. 179/175.3 F, 175.3 R, 179/175.2 R, 175, 175.31 E; 370/13, 15, 17; 371/22

[56] References Cited

U.S. PATENT DOCUMENTS 3,637,954  1/1972  Anderson et al. .......... 179/175.31 E Primary Examiner—Stafford D. Schreyer
Attorney, Agent, or Firm—John T. O'Halloran; Thomas P. O'Hare

[57] ABSTRACT

For locating faults in digital telecommunication subscriber terminations various test loops (A, B, C) are closed and checked by signals transmitted via the exchange (16). When a fault is proved to exist in the so-called C-loop, it cannot be detected whether the fault is in the subscriber line (2) or in the network termination (1). In order to be able to distinguish between the two sources of fault, and when the subscriber line (2) is in an unobjectionable state, the filter coefficients which are continuously adjusted in a recursive filter contained in the echo canceller (24) of the subscribers group circuit (17), are stored. Since, in the case of a faulty subscriber line (2), the echo canceller (24), based on the received pulse answer, adjusts changed filter coefficients, it is possible to localize the location of fault by way of comparing the continuous coefficients with the stored coefficients.

7 Claims, 4 Drawing Figures

METHOD OF AND CIRCUIT FOR LOCATING FAULTS IN A DIGITAL TELECOMMUNICATION SUBSCRIBER TERMINATION

The invention relates to a method of locating faults in a digital telecommunication subscriber termination in which, in a network termination, there is closed a test loop including the subscriber's line, thus detecting whether signals transmitted by the exchange, are properly received again.

Figure 1:
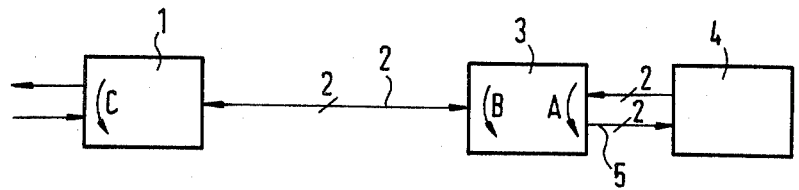

Test loops permitting an automatic location of faults in telecommunication switching systems with digital connections extending up to the subscriber, have been suggested by international committees (CEPT) and PTT administrations (see also the description of FIG. 1). With the aid of these test loops it is possible to locate a fault existing within the exchange, or else it can be determined that the fault exists outside the exchange. In the latter case, however, it cannot be detected whether the subscriber line is damaged or whether the network termination is defective. For the PTT administrations, however, it could be very useful to be able to distinguish between the two kinds of faults, which would very much facilitate the removal of faults.

It is the object of the invention to provide a fault locating method with the aid of which it is possible to distinguish whether a fault exists in a subscriber terminal equipment or in the subscriber's line.

In one method of the aforementioned type, this object is achieved in that the adaptive recursive filter coefficients which are continuously and automatically adjusted in accordance with an echo cancellation method, are compared with coefficients which have been ascertained in the faultless state of a subscriber termination and thereafter stored, and in that from the deviations between the respective coefficients, it is determined whether a fault exists in a subscriber's line or in the network termination.

A fault-locating circuit in a digital telecommunication subscriber termination comprising an exchange-sided subscribers group circuit, a subscriber's line and a network termination, in which a test loop is closed and checked with the aid of signals transmitted by the exchange, is characterized according to the invention, in that an adaptive recursive echo canceller existing in the subscribers group circuit, is associated with a memory into which filter coefficients are written which have been adjusted in the faultless state of the subscriber's line, and in that, in an evaluating circuit to which the stored and newly adjusted filter coefficients are fed, it is determined whether the subscribers group circuit is faulty.

Advantageous further embodiments of the invention are set forth in the subclaims.

Figure 2:
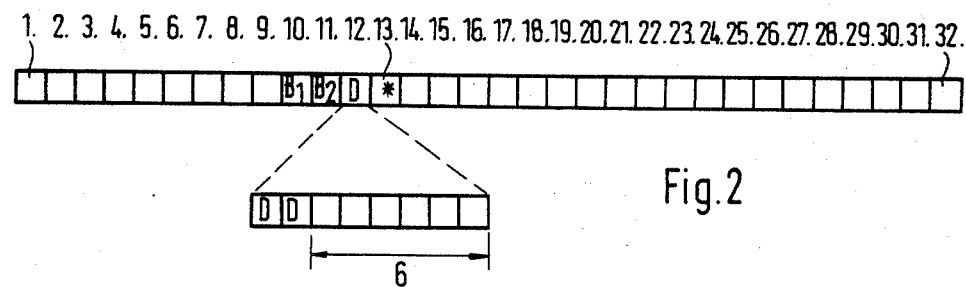
Figure 3:
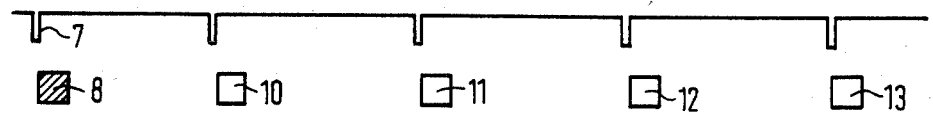
Figure 4:
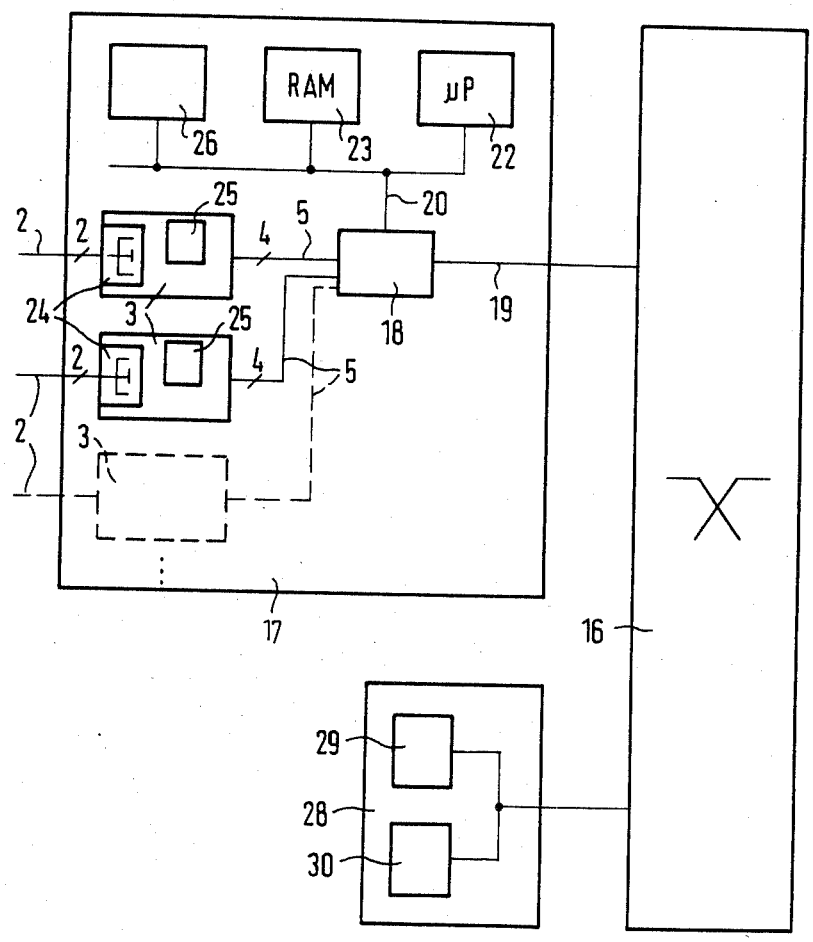

In the following, one example of embodiment of the invention will now be explained with reference to FIGS. 1 to 4 of the accompanying drawings, in which:

FIG. 1 is a schematical representation of a digital subscriber termination from which the various test loops can be seen, FIG. 2 shows the frame construction of a PCM-32 system according to which signals and data are transmitted between the exchange termination and the subscribers group circuit, FIG. 3 is the schematical representation showing the transmission of the filter coefficients in a D-channel of the PCM system according to FIG.2, and FIG. 4 shows a fault-locating circuit according to the invention.

A digital subscriber termination (FIG. 1) substantially comprises the following constituent parts:

a network termination terminating the digital network on the subscriber's premises. In direction towards the subscriber (that is, toward the left in the drawing) there may still follow further terminations which, however, are not shown in the drawings as being without importance to the invention.

a subscriber line 2 which is usually of the two-wire type and on which signals are exchanged in accordance with various conventional methods, between the subscriber and the exchange. Within the scope of the present invention, there is carried out a two-wire duplex transmission with an echo cancellation, also known as a duplex-channel system.

a line termination 3 representing the termination of the subscriber line towards the exchange.

an exchange termination 4 by which several line terminations 3 are connected to the switching facilities of the exchange. The exchange termination 4 is connected to the line termination 3 with the aid of a four-wire line 5.

International standardization proposals have been made for the following test loops:

test loop A: the loop is closed on the input side of the line termination 3 facing the exchange, by a command which is either produced automatically or fed in by an operator, and permits the testing of the four-wire line 5. The closing of the individual test loops is indicated by the curved arrows in FIG. 1.

test loop B: this loop is closed on the output side of the line termination 3 and permits to check the functioning of the line termination 3.

test loop C: this loop is closed on the output side of the network termination 1 on the subscriber side and is supposed to enable a checking of the functionability of the network termination 1.

If data transmitted from the exchange via the test loop C, are not properly received again then either the subscriber line 2 is faulty (e.g. short circuit, idling, etc.) or else the network termination 1 is out of function. These two possible sources of error cannot be distinguished with the aid of the test loops, but a distinction would be very desirable for the operating telecommunication (PTT) administration.

In order to be able to transmit messages over the two-wire subscriber line 2 in both directions simultaneously and within the same frequency range (e.g. in the baseband), the network termination 1 as well as the line termination 3 contain an echo canceller (see e.g. ntz, Vol.35 (1982), No. 1, pp 12 to 15). Also in the case of a disturbed test loop C, the coefficients of the echo canceller are continuously adjusted in the line termination 3, i.e. in accordance with the pulse answer received from the subscriber line. From the continuously adjusted filter coefficients it is possible to ascertain the state of the line termination 3. When the continuously adjusted coefficients are interrogated and compared with coefficients adjusted and stored in the unobjectionable state of the subscriber line, it is possible to detect whether the subscriber line is unobjectionable or defective. Thus, in the case of a fault detected via the test loop C it can be distinguished whether the fault is caused by the defective subscriber line 2 or by a disturbed network termination 1. When echo cancellation or suppression is carried out with the aid of a transversal filter, a respectively larger number of filter coefficients will have to be stored: for example 20 to 40 coefficients each with an accuracy of 16 bit. It is more appropriate, therefore, to realize the echo canceller at least partially with the aid of a recursive filter (cf. DE-OS No. 31 20 434) in which case it will then be sufficient to store only a few recursive filter coefficients.

A recursive filter of the second degree can be described by the following relation $$P(z^{-1}) = \frac{a_o + a_1 z^{-1}}{1 - b_1 z^{-1} - b_2 z^{-2}}$$

where:

$z = e^{j\Omega T_S}$ = complex frequency variable ($T_S$=sampling period), $a_o$, $a_1$ = coefficients of the numerator polynomial, $b_1$, $b_2$ = coefficients of the denominator polynomial.

With such a type of filter it is sufficient to store two coefficients $b_1$ and $b_2$ which are determinative of the poles of the filter function.

Over the four-wire line 5 connecting the line termination 3 to the exchange termination 4, the digital messages according to the PCM method are transmitted with 32 channels and at a bit sequence frequency of 2.048 Mbit/s. The 32 channels of the PCM frame are schematically shown in FIG. 2.

At the digital subscriber termination there is standardized a net bit sequence frequency or bit rate of 144 kbit/s, to which there are still added the synchronizing bits. In this way there are formed: a transparent channel $B_1$ with 64 kbit/s, a transparent channel $B_2$ likewise with 64 kbit/s and a signalling channel D with 16 kbit/s. Of the available 32 channels there are occupied for the channels $B_1$ and $B_2$ two PCM channels, and for the channel D merely 2 bits are occupied in a third PCM channel, as is indicated in FIG. 2. With the remaining six bits 6 of the third PCM channel or else over a fourth PCM channel, the control information causing the readout of the recursive filter coefficient of the echo canceller, is transmitted from the exchange termination 4 to the line termination 3. The coefficients as respectively represented by 16 bits, are then transmitted from the line termination 3, via the fourth PCM channel, to the exchange termination 4. They may then be evaluated in a control computer contained in the exchange termination 4 or may be forwarded to the maintenance computer of the exchange for being evaluated. In the most simple case, the evaluation is carried out by way of comparison. If the difference between the continuously adjusted coefficients and the stored coefficients exceeds a predetermined value, the subscriber line 2 is disturbed.

The upper part of FIG. 3 shows a number of 8-kHz pulses 7, which, for example, mark the PCM channel No. 13 in which the filter coefficients are transmitted. At first there is transmitted a password 8 consisting, e.g. of 8 zero bits, for characterizing the coefficients. After the lapse of 125 μsec there is transmitted a first word 10 consisting of the first eight bits e.g. of the coefficient $c_1$. A second word 11 containing the remaining eight bits of the coefficient $c_1$, follows after another 125 μsec. A third word 13 contains the first eight bits of the coefficient $c_2$, and a fourth word 14 contains the remaining eight bits of this coefficient. Thereafter, all of the subsequently adjusted actual filter coefficients are transmitted.

A digital exchange 16, such as a "System 12" local exchange is provided with a larger number of subscriber group circuits 17, of which only one is shown in the drawing. Each of these group circuits 17 contains several, e.g. four to eight line terminations 3, of which two are shown in the drawing. Via each time one four-wire line 5 they are respectively connected to a control interface circuit 18. This control interface, in turn, is connected via a multiple line 19 to the exchange, that is, in particular to the switching devices thereof, and, by means of a bus system 20, to a control circuit 22 which chiefly consists of a microprocessor, as well as to one or more read-write memories 23.

Each of the line terminations 3 contains one of the already mentioned echo cancellers 24 as well as one coefficient memory 25 in which the recursive filter coefficients are stored, which were adjusted while the subscriber line 2 was in a proper working condition. Instead of the coefficient memory 25 in each individual line termination 3 it is also possible to provide one common coefficient memory 26 in the subscribers group circuit 17 which takes up the filter coefficients of all line terminations 3. This memory 26 which is common to all line terminations 3, however, may also form part of the read-write mmemory 23.

The control circuit 22 provides the signals and data necessary for performing the automatic test method and evaluates the received signals. When this control circuit 22 notices a fault on the test loop C, it calls up the respective filter coefficients as continuously adjusted in the individual echo canceller, and compares them with those filter coefficients which were adjusted and stored while the subscriber line 2 was in an unobjectionable working order. When the difference between the two groups of coefficients exceeds the predetermined values, the control circuit 22 produces a signal signalling a defective subscriber line, which is forwarded, for example, to a control and maintenance unit 28. This faciity contains a maintenance computer 29 and one or more memories 30. The test methods can also be controlled by the maintenance computer 29 which, in this case, also evaluates the filter coefficients. Relative thereto, these filter coefficients may also be filed in a part of the memory 25 or in an additional memory. The evaluation of the filter coefficients may also be carried out in a simple comparator which is controlled either by the control circuit 22 or by the maintenance computer 29.

The further circuit components (cf. FIG. 4) which are contained apart from the line terminations 3, in the subscribers group circuit 17, correspond to those of the exchange termination 4 (cf. FIG. 1).

The mode of operation of the method and of the described circuit according to the invention, is summarized hereinafter.

For locating faults in digital telecommunication subscriber terminations various test loops A, B, C are closed and checked by signals transmitted via the exchange 16. When a fault is proved to exist in the so-called C-loop, it cannot be detected whether the fault is in the subscriber line 2 or in the network termination 1. In order to be able to distinguish between the two sources of fault, and when the subscriber line 2 is in an unobjectionable state, the filter coefficients which are continuously adjusted in a recursive filter contained in the echo canceller 24 of the subscribers group circuit 17, are stored. Since, in the case of a faulty subscriber line 2, the echo canceller 24, based on the received pulse answer, adjusts changed filter coefficients, it is possible to localize the location of fault by way of comparing the continuous coefficients with the stored coefficients.

I claim:

1. A method for locating faults in a telecommunication subscriber termination comprising a network termination connected to a subscriber's line comprising the steps of:

ascertaining and storing in memory located separate from an echo canceller coefficients determined from a digital filter within said echo canceller when said subscriber termination is operating faultlessly;

closing a test line including the subscriber's line to determine whether a fault exists;

determining, in the event of a fault, coefficients from said digital filter as continuously and automatically adjusted during an echo cancellation method; and comparing said coefficients determined during a fault with said coefficients determined when said subscriber termination is operating faultlessly whereby whether a fault exists in the subscriber's line or in the network termination can be determined.

2. A method as claimed in claim 1, characterized in that one or two coefficients, which are determinative of poles of a filter function of a digital recursive filter, are stored.

3. A method as claimed in claim 1, characterized in that the respective newly adjusted coefficients are transmitted via a PCM channel to an exchange where they are evaluated.

4. A circuit for locating faults in a telecommunication subscriber termination comprising:

a network termination;

a subscriber's line connected to said network termination;

an echo canceller containing an adaptive digital filter capable of generating a continuous and automatic series of coefficients when a fault is detected, said echo canceller being connected to said subscriber's line;

a digital memory connected to said adaptive digital filter with capacity for storing coefficients from said digital filter determined during faultless operation of said subscriber's line and said network termination; and an evaluating circuit connected to said echo canceller and to said memory for comparing said coefficients stored in said memory with said continuous and automatic series of coefficients generated by said adaptive digital filter whereby whether a fault exists in the subscriber's line or in the network termination can be determined.

5. A circuit as claimed in claim 4, characterized in that the digital filter of said echo canceller, comprises a recursive filter.

6. A circuit as claimed in claim 4, characterized in that said evaluating circuit is provided for in a subscribers group circuit.

7. A circuit as claimed in claim 4, characterized in that said memory is contained in a line termination connected between said network termination and said exchange.

* * * * *